United States Patent [19]
Fujita

[11] Patent Number: 5,473,476
[45] Date of Patent: Dec. 5, 1995

[54] DOOR MIRROR ASSEMBLY

[75] Inventor: Masaki Fujita, Aichi, Japan

[73] Assignee: Kabushiki Kaisha Tokai Rika Denki Seisakusho, Aichi, Japan

[21] Appl. No.: 777,794

[22] Filed: Oct. 17, 1991

[30] Foreign Application Priority Data

Oct. 18, 1990 [JP] Japan ................... 2-109642 U

[51] Int. Cl.⁶ ..................... G02B 7/182; B60R 1/06
[52] U.S. Cl. ................. 359/872; 359/876; 359/877; 248/476; 248/487
[58] Field of Search ................... 359/872, 873, 359/874, 876, 877; 248/475.1, 476, 487

[56] References Cited

U.S. PATENT DOCUMENTS

| | | | |
|---|---|---|---|
| 3,788,734 | 1/1974 | McDuffee, Sr. | 359/876 |
| 3,966,162 | 6/1976 | Hadley | 248/487 |
| 4,606,619 | 8/1986 | Yamana | 359/841 |
| 4,786,156 | 11/1988 | Kotani et al. | 359/872 |
| 4,913,543 | 4/1990 | Haba et al. | 359/875 |
| 4,957,359 | 9/1990 | Kruse et al. | 359/877 |
| 4,981,279 | 1/1991 | Andreas et al. | 359/872 |
| 4,991,950 | 2/1991 | Lang et al. | 359/877 |

FOREIGN PATENT DOCUMENTS 0244639  12/1985  Japan ...................... 359/877

*Primary Examiner*—Ricky D. Shafer
*Attorney, Agent, or Firm*—Birch, Stewart, Kolasch & Birch

[57] ABSTRACT

A door mirror assembly in use for vehicles having a support member for rigidly supporting a mirror drive unit. A support arm extending from a bracket to be secured to a door of the vehicle is connected with a support plate which is integrated with the mirror drive unit and secured to the visor. Thus, the mirror drive unit, and therefore the mirror supported by the drive unit, are rigidly supported by both the visor and the support arm.

4 Claims, 1 Drawing Sheet

DOOR MIRROR ASSEMBLY

BACKGROUND OF THE INVENTION

1. Field of the Invention

The present invention generally relates to a door mirror assembly for use in vehicles, and more particularly to an arrangement for supporting the mirror drive unit with a mirror which is accommodated in a visor.

2. Description of the Related Art

Conventionally, in a door mirror assembly of a type wherein a stay secured to the door of the vehicle and a visor accommodating the mirror and mirror drive unit are integrally made as a single member, the drive unit is secured to the bosses projecting from the inner surface of the visor and the mirror is supported by the drive unit.

In the above arrangement of the conventional assembly, the drive unit is supported the visor, i.e. the rigidity of the visor. It is noted that by the visor is generally made from plastic having a relatively low rigidity. Therefore, the visor vibrates easily by the vibration of the driving vehicle and the pressure of wind, resulting in vibration of the mirror supported by the visor through the drive unit so that the visibility in the mirror is lowered.

SUMMARY OF THE INVENTION

Accordingly, an essential object of the present invention is to provide an improved door mirror for use in vehicles in which the support for the mirror drive unit is increased so that the mirror can be supported in a stable manner.

In accomplishing this and other objects, according to the present invention, there is provided a door mirror assembly for use in vehicles which comprises a mirror; a mirror drive unit for pivotally supporting said mirror so as to move said mirror around vertical and horizontal axes thereof; a visor for accommodating said mirror drive unit with said mirror, said mirror drive unit being secured to said visor; a stay integrated with said mirror visor which faces on a door of said vehicle; and a bracket located in the stay to be secured to said door and having an arm extending into said visor to be rigidly connected with said mirror drive unit, said stay being secured to said bracket.

With the above construction according to the present invention, since the mirror drive unit with the mirror is supported by the support arm extending from the bracket generally made of metal, the rigidity for supporting the mirror drive unit, and therefore the mirror, is increased so that the possible vibration of the mirror during the driving of the vehicle can be efficiently reduced.

In the door mirror assembly as described above, the drive unit preferably has a support plate to which the arm is connected.

According to a preferred embodiment of the present invention, the arm and the support plate connected to each other are secured to the visor at a connecting point thereof.

Further, according to another embodiment of the present invention, the arm and the support plate are made integrally with each other as a single member.

BRIEF DESCRIPTION OF THE DRAWINGS

This and other objects and features for the present invention will become apparent from the following description taken in conjunction with the preferred embodiment thereof with reference to the accompanying drawings, in which.

DETAILED DESCRIPTION OF THE INVENTION

Figure 1:
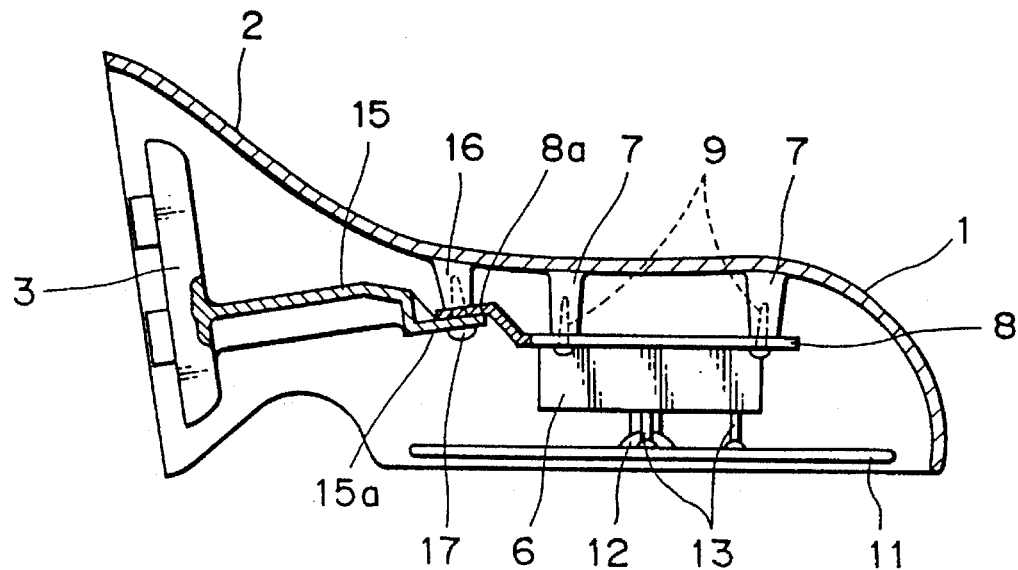
FIG. 1 is a cross-sectional showing a door mirror assembly according to one preferred embodiment of the present invention.
Figure 2:
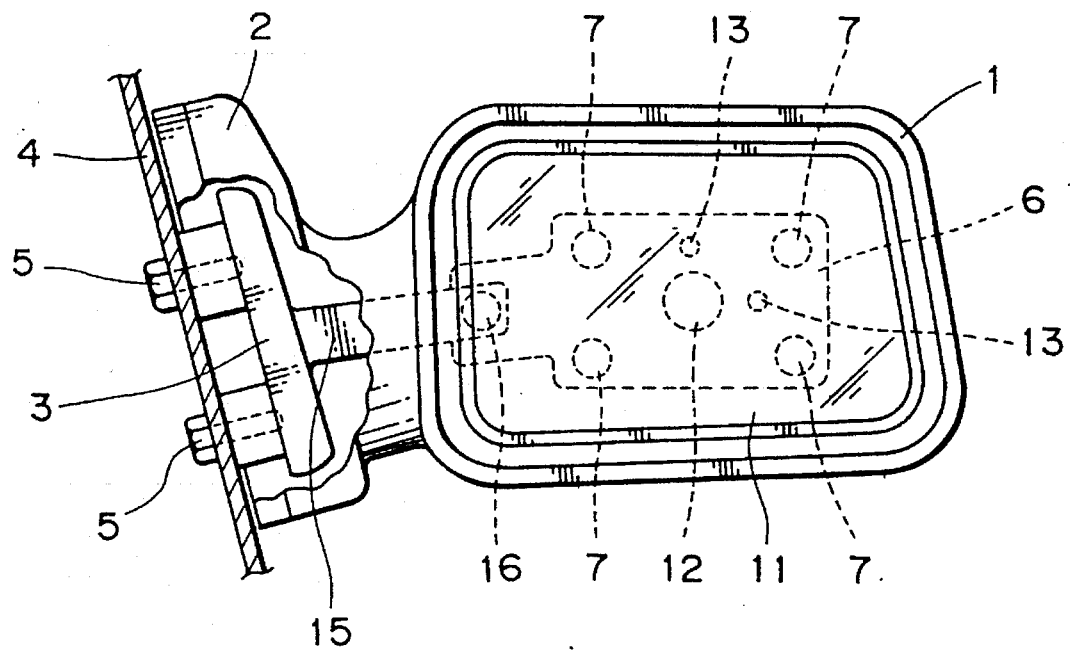
FIG. 2 is a front view, partially broken, showing the door assembly of FIG. 1.

Before the description of the present invention proceeds, it is to be noted that like parts are designated by like reference numerals throughout the accompanying drawings.

Referring to the figures, the reference numeral 1 denotes a visor integral with a stay 2. A mounting metal bracket 3 is arranged in the stay 2 and secured to the body of a vehicle, i.e. the door 4, by means of bolts 5. The stay 2 is secured to the bracket 3 by a screw.

A drive unit 6 for moving a mirror 11 around the vertical and horizontal axes thereof is accommodated in and secured to the visor 1. Namely, the visor 1 has several bosses 7 projecting from the inner surface thereof to which a support plate 8 of the drive unit 6 is secured by means of screws 9. The center portion of the rear surface of the mirror 11 is pivotally jointed to the center portion of the front surface of the drive unit 6 by means of a universal joint 12, and each end of a pair of driving rods 13 projecting from the drive unit 6 are operatively connected to the rear surface of the mirror 11, which arrangement is well known conventionally.

A metal support arm 15 integrated with the bracket 3 projects in a substantially horizontal direction, an end 15a of which is rigidly connected with the left end portion 8a of the support plate 8 by means of screw 17. The screw 17, and therefore the end 15a of the arm 15 and the end portion 8a of the plate 8, are also secured to another boss 16 projecting from the inner surface of the visor 1.

With the arrangement as described above, the drive unit 6 is rigidly secured to the visor 1 at the bosses 7 and also rigidly connected to the supporting arm 15. That is, the drive unit 6 is not supported by only the visor 1, contrary to the conventional art, but the drive unit 6 is also supported by the support arm 15 which is rigidly mounted on the door 4 together with the bracket 3. Therefore, the rigidity for supporting the drive unit 6 is remarkably improved so that the possible vibration of the mirror caused due to the vibration of the driving vehicle and the pressure of the wind is reduced.

Further, since the visor 1 is secured to both the support arm 15 and the support plate 8, the visor 1 is also reinforced thereby so that the vibration of the visor 1 and the possible deformation thereof are efficiently reduced.

Alternatively, the bracket 3 with the support arm 15 and the support plate 8 may be made as a single member.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A door mirror assembly for use in vehicles comprising:

a mirror;

a mirror drive unit for pivotally supporting said mirror so as to move said mirror around vertical and horizontal axes thereof;

a visor for accommodating said mirror drive unit with said mirror, said mirror drive unit being secured to said visor;

a stay integrated with said mirror visor and facing a door of said vehicle; and a bracket housed within the stay and secured to said door and having a support arm extending into said visor rigidly connected with said mirror drive unit, said stay being secured to said bracket, whereby said mirror drive unit is rigidly fixed to said door by connection of said visor to said stay and connection of said support to said bracket, thereby reducing vibration of said mirror.

2. The door mirror assembly as claimed in claim 1, wherein said drive unit has a support plate to which said support arm is connected.

3. The door assembly as claimed in claim 2, wherein said support arm and said support plate connected to each other are secured to said visor at a connecting point thereof.

4. The door assembly as claimed in claim 2, wherein said support arm and said support plate are of a one-piece construction.

* * * * *